Jan. 18, 1949.  G. L. USSELMAN  2,459,557
WAVE LENGTH MODULATION
Filed March 11, 1944  2 Sheets-Sheet 1

INVENTOR.
GEORGE L. USSELMAN
BY  H. S. Grover
ATTORNEY.

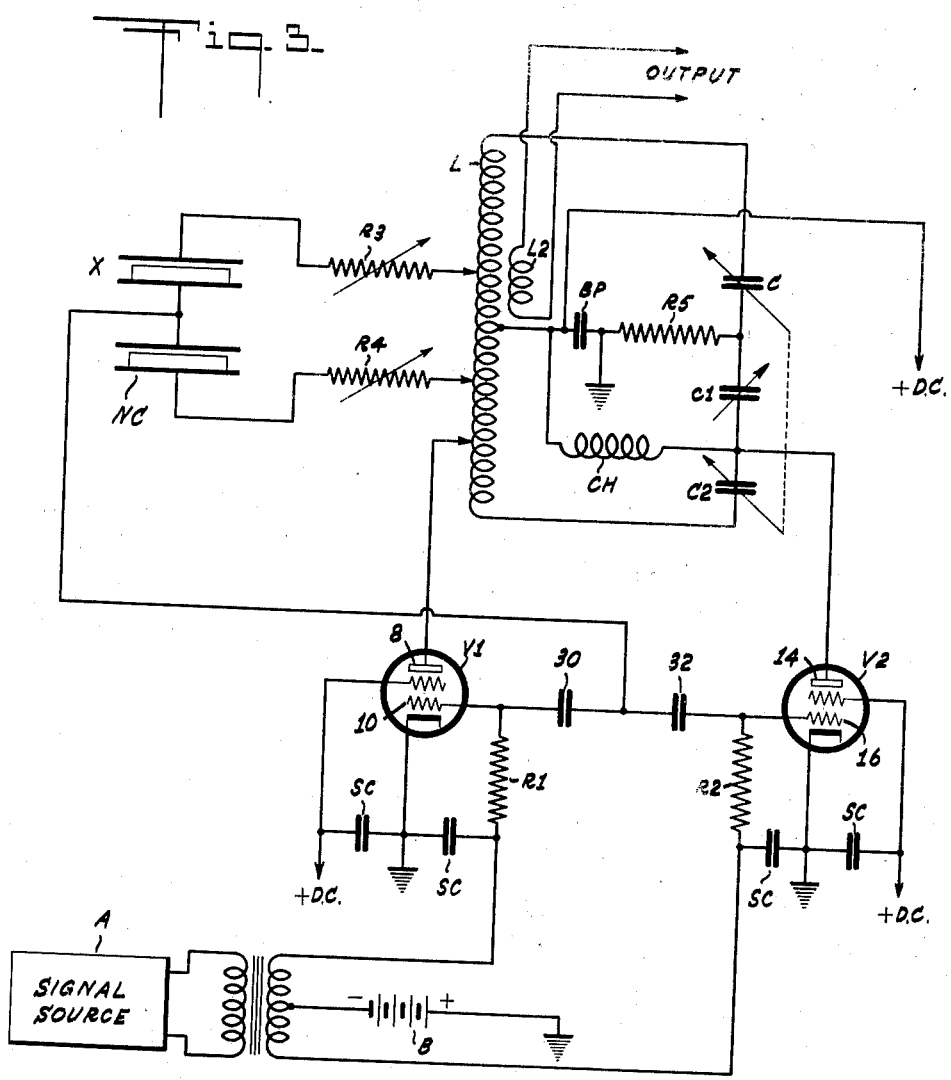

Patented Jan. 18, 1949

2,459,557

UNITED STATES PATENT OFFICE 2,459,557

WAVE LENGTH MODULATION

George L. Usselman, Port Jefferson, N. Y., assignor to Radio Corporation of America, a corporation of Delaware Application March 11, 1944, Serial No. 526,008

5 Claims. (Cl. 179—171.5)

This application concerns timing modulation systems, and more particularly systems for generating wave energy and controlling or modulating the timing of the generated wave energy as desired.

Many systems for this purpose are known in the radio art, and the general object of this invention is improved wave generation and wave angle or length control.

A more specific object of the present invention is to provide a simplified and more efficient arrangement for generating wave energy and controlling the timing thereof, which arrangement uses a relatively small number of tubes and circuit elements.

In many timing modulation systems known in the prior art, the angular or timing modulation in accordance with control or signals is accompanied by considerable undesired amplitude modulation.

An additional object of this invention is a timing or angular velocity modulation system wherein the generative wave energy is stabilized as to mean frequency and yet is controllable as to timing through a considerable range. Moreover, such control is accomplished without causing undue, undesired amplitude variation of the wave.

The manner in which the above objects and other objects which appear hereinafter are attained will be apparent from the description which follows, and therefrom when read in connection with the drawings.

Figure 1:
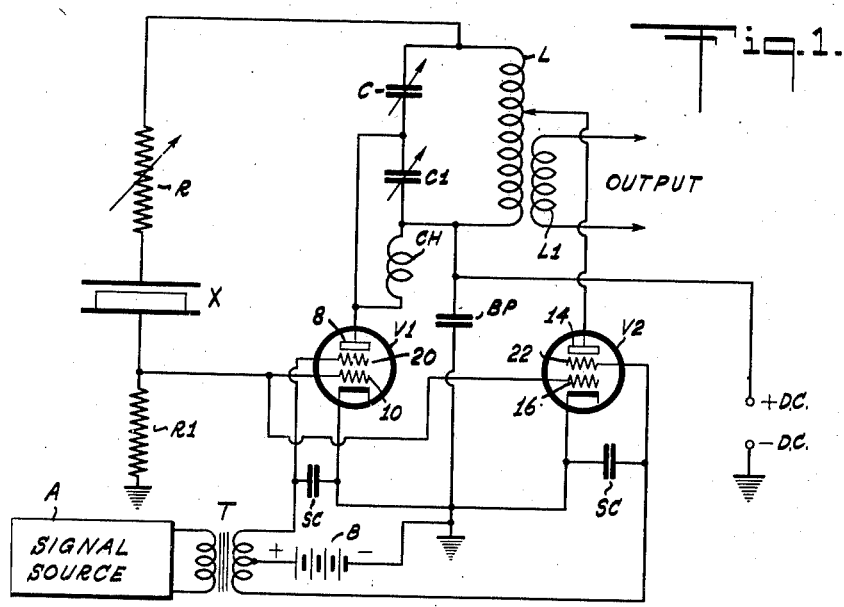
Figure 2:
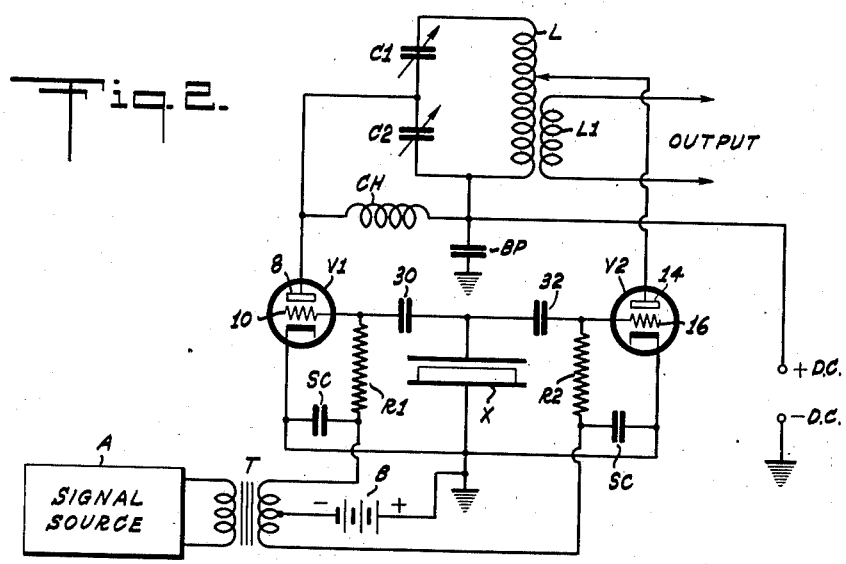

In the drawings, Figs. 1 to 3, inclusive, each shows an embodiment of my improved system. In each of these modifications a pair of electron discharge devices are arranged in oscillatory energy generating circuits and have associated therewith means for modulating the angle or timing of the generated oscillations. The generator in Fig. 1 is a tube oscillator of the Pierce type. The generator of Fig. 2 is a modification of the generator of Fig. 1, while the oscillation generator of Fig. 3 is of the Hartley type.

In Fig. 1 of the drawings, the tank circuit comprising an inductive branch L and a capacitive branch C, CI is connected in an oscillation generating circuit including two tubes VI and V2. The tubes as connected may be individually considered as generating means, but since they use a common crystal in the feedback path and a common tank circuit they are constrained to generate oscillations in unison and may be considered a single generator.

In the arrangement shown, the anode 8 of tube VI is coupled to a point between the condensers C and CI, that is, to the capacitive leg of the tank circuit. The control electrode 10 of this tube is coupled by a crystal X and a variable resistor R to a high radio frequency potential point on the tank circuit C, CI and L. A point on the tank circuit is connected to the tube cathodes and grounded for radio frequency by a bypassing and direct current blocking condenser BP. The control grid 10 is supplied with biasing potential due to the drop of potential in RI caused by current due to grid rectification in the tube. Supplemental biasing potential may be supplied if desired. Direct current potential for the anode is supplied through a choke CH connected to a source of direct current potential.

The anode 14 of tube V2 is coupled to the inductive branch L of the tank circuit while the grid 16 of this tube is also coupled by the crystal X and resistance R to the same high radio frequency potential point on the tank circuit. The grid resistor RI also supplies biasing potenntial for the grid 16. The output circuit may comprise an inductance LI coupled to L. The tank circuit L, C, CI is tuned to the crystal carrier frequency when the tubes VI and V2 draw equal currents.

Oscillations are generated by virtue of the fact that the anode of each tube operates at a first potential and the control grid of each tube is supplied a feedback potential by way of the crystal X, so that the anode and grids of the two tubes operate at opposed radio frequency potentials. Oscillations are generated and the oscillation generators may be considered of the modified Pierce type, wherein the anode is connected with a tank circuit and the feedback is by way of a crystal and the crystal holder capacity from the anode or tank circuit to the control grid. The oscillating crystal behaves like a series tuned circuit. It is also shunted by the capacity of the crystal holder. In this type of oscillator the crystal oscillates slightly off resonance so that it represents an inductive reactance. This inductive reactance being in parallel with the crystal holder capacitive reactance forms a tuned circuit at the operating frequency. The grids being connected to the opposite side of the crystal from the anodes will have opposite phase. This is the condition for maintaining oscillations.

The resistance R is for the purpose of varying the feedback. Varying the feedback varies the strength of the oscillations generated.

The oscillation generating tubes VI and V2 also have as a function modulation or control of the timing of the oscillations generated. The impedance between the anode and cathode of tube V1 is connected across C1, that is, across a part of the capacitive leg and constitutes a variable resistance tapped across the condenser C1 which is a portion of the total tank capacitive reactance and determines in part the frequency of the oscillations generated.

The tube V2 has its output impedance coupled across a portion of the inductive branch L of the tank circuit so that this tube output impedance constitutes a variable resistance tapped across a part of L, which is equivalent to being tapped across a part of the total tank inductive reactance, which also determines in part the frequency of the oscillations generated.

It is known that if a resistance is tapped across a portion of any reactance the total effective reactance is changed. A variation of this resistance also produces a variation in the total reactance. Where the reactance is used in an oscillation generator circuit as is the case here, this causes a change in frequency of the oscillations generated.

In the arrangement disclosed, one tube's output is tapped across a portion of the capacitive reactance and the other tube's output is tapped across the inductive reactance of the tank circuit. If both of these tube resistances are alike and are tapped across the same proportion of the total reactance of the two branches of the tank circuit, the frequency to which the tank circuit is tuned is not changed. This is because the increase in capacitive reactance is accompanied by a decrease in inductive reactance and vice versa, so that in general the tuning of the circuit is unchanged. As long as these tube resistances remain equal though they be varied, the tuning of the circuit remains unchanged. However, if one resistance is changed, for example, by changing the current in one tube, or if both tube resistances be changed in opposite sense, for example by changing the current in both tubes in opposite sense, then the tuning frequency of the tank circuit is changed.

The tube impedances are controlled by signals from a source A applied differentially by transformer T to the screening electrodes 20 and 22. Since the tube output impedances shunt portions of the tank reactance, as explained in detail above, and since the tubes are differentially controlled the timing of the oscillations generated is modulated and the arrangement is a timing modulation system.

The screening grids 20 and 22 in addition to serving as the modulating means are also used for shielding. In other words, the control grids are screened or shielded from the anodes so that the circuit does not require neutralizing. However, the bypass condensers SC have enough impedance at audio frequencies to permit audio modulation of the screen grid potentials.

The values of the circuit elements depend upon the frequency of the oscillations it is desired to generate and are known to those skilled in the art. Since the value of many of the elements such as L, C, C1, and the dimensions of X are different for different frequencies and operation, it does not appear desirable to list the same here.

The condenser BP is of sufficient capacity to substantially ground one end of the tank circuit C, C1 and L for radio frequency, and of insulating value sufficient to stand direct current potential supplied to the anodes of the tubes without breaking down. The condensers SC are of sufficient value to shunt radio frequency voltages of the generated frequency around the secondary of transformer T. Direct current potential for the screen grids 20 and 22 is supplied from a separate source B but may be supplied from the main source connected with the anodes of the tubes.

In operation the amount of frequency shift is proportional to and is in a direction according to the signal amplitude variations and the frequency of these variations corresponds to the original signal frequency. Since the tubes are operating differentially on the same tank circuit, the amplitude modulation circuit is balanced out.

The embodiment in Fig. 2 is substantially similar in many respects to the embodiment in Fig. 1. In Fig. 2, however, the crystal X is connected by radio frequency coupling condensers 30 and 32 between the control grids 10 and 16 of tubes V1 and V2 and ground or the cathodes of these tubes. The oscillators in this case are of the tuned plate, tuned grid type. Oscillations are generated by virtue of feedback between the anode 8 and control grid 10 of tube V1 and the anode 14 to control grid 16 of tube V2. The crystal X is in the grid circuits of both tubes and constrains the tubes to generate oscillations of the same frequency. In this case, the crystal and its holder acts as a series tuned circuit between the grids and the cathodes. The crystal oscillates off resonance slightly so that it acts as an inductive reactance which tunes the tube anode to grid capacitive reactance. This gives the grids opposite phase from that of the anodes, which is the condition for oscillations.

Modulation is applied from a source A by way of resistors R1 and R2 differentially to the control grids 10 and 16. Resistors R1 and R2 are the biasing resistors and supply negative potentials to the grids 10 and 16 respectively due to current resulting from grid rectification. A source B may supply a supplemental bias when desired.

Both embodiments have this in common. The grids and cathodes of the two tubes are in parallel and the anodes operate at radio frequency potential of the same polarity. The output impedances of the tubes are each across a portion of the tank circuit so that differential modulation of the tube conductances modulates the frequency of the oscillations generated. The oscillations generated are stabilized as to mean frequency by the crystal X and the frequency or timing of the oscillations varies about this frequency as a mean in accordance with the signals. In other words, differential modulation of the tubes V1 and V2 swings the tuning of tank circuit L, C, C1, C2 to higher and lower frequencies. Consequently, the oscillating frequency of the circuit also swings up and down within the limits of the crystal control.

In the embodiment of Fig. 3, the arrangement is somewhat different. The tank circuit L, C, C1, C2 has a point thereon intermediate the ends of L and between the condensers C and C1 connected to the tube cathodes and to ground by a radio frequency bypassing and coupling and direct current blocking condenser BP, so that the ends of the tank circuit L, C, C1, C2 may be considered as operating at opposed radio frequency potentials with ground radio frequency potential at the mid-point. The anode 8 of tube V1 is now connected to L on one side of the ground connection, while the anode 14 of tube V2 is connected between C1 and C2, that is, at the same side of the ground connection. The grids 10 and 16 are tied together by the coupling condensers 30 and 32 and connected by way of crystal X and resistance R3 to a point on L on the opposite side of the ground connection, so that the generated voltages on the anodes and grids of the tubes are of opposed phase.

The neutralizing condenser NC is coupled by a resistance R4 to a point on L spaced from the grounded point a distance such that R3 and R4 are tapped to L symmetrically with respect to the center or radio frequency ground point of L. The neutralizing condenser NC is made as nearly like the crystal X as possible except that the quartz used in neutralizing condenser NC is of a type that will not oscillate. Thus the capacity of crystal X is completely neutralized by NC to maintain symmetry in the system.

Oscillations are generated by virtue of the fact that the anodes and grids of the tubes are operating at opposed radio frequency potentials. The resistance R5 between the adjacent terminals of C and C1 and ground is to assure tuning of the tank circuit as a unit, that is, to prevent split tuning of the opposite ends thereof.

Modulation is again as in Fig. 2, that is, applied to the control grids. The screen grids are used for shielding purposes. The tank circuit L, C, C1, C2 is tuned for the crystal carrier frequency when tubes V1 and V2 carry equal currents. As described hereinbefore, differential modulation of the currents in tubes V1 and V2 alternately change the tank tuning for inductive and capacitive reactances. This is because a part of L is shunted by V1's output while C2 is shunted by V2's output. This swings the carrier frequency up and down in accordance with signals. Since the control grids of V1 and V2 are parallel as in the prior embodiments, the tubes operate in unison and can operate only at the same frequency simultaneously. Also, the crystal filter X and the neutralizing condenser NC permit only a certain band of frequencies to be fed back to the grids. Because this is so, in effect the frequency modulation is limited to a previously determined frequency band. Amplitude modulation is balanced outout for reasons described hereinbefore.

The resistances R3 and R4 aid in adjusting the amount of feedback energy and make neutralizing adjustment easier. For this purpose the resistors are made adjustable, and in this respect serve a purpose similar to the purpose of resistor R in Fig. 1. In other words, the resistors may be used to adjust the amount of feedback. However, the feedback is usually adjusted by moving the connection points on the coil L. The resistors R3 and R4 are more useful in improving the filter action of the crystal, that is, they separate the filter action of the crystal from the tank circuit, so that one can not have too much influence on the operation of the other.

I claim:

1. In a wave generating and wave length modulating system, a tank circuit having parallel branches, one of which branches comprises series capacitors and the other of which branches comprises an inductor, two electron discharge devices each having an anode, a control grid and a cathode, an alternating current coupling between the anode of one device and a point on said capacitive branch intermediate the series capacitors thereof, an alternating current coupling between the anode of the other device and a point on said inductor of said inductive branch of said circuit, an alternating current coupling between the cathodes of said devices and a third point on the parallel branched tank circuit, a piezo-electric crystal in a holder having two terminals, a variable resistor connecting one terminal of said crystal holder to a fourth point on said parallel branched circuit, an alternating current circuit coupling the other terminal of said holder to the control grids of said devices, direct current biasing circuits for said control grids, direct current charging circuits for said anodes and a source of modulating potentials coupled differentially between corresponding electrodes of said devices.

2. In a wave generating and wave length modulating system, a tank circuit having parallel branches, one of which branches comprises series capacitors and the other of which branches comprises an inductor, two electron discharge devices each having an anode, a control grid and a cathode, an alternating current coupling between the anode of one device and a point on said capacitive branch intermediate the series capacitors thereof, an alternating current coupling between the anode of the other device and a point on said inductor of said inductive branch of said circuit, an alternating current coupling between the cathodes of said devices and one terminal of the parallel branched tank circuit, a piezo-electric crystal in a holder having two terminals, an alternating current coupling between one terminal of the crystal holder and the control grids of said devices, an alternating current coupling between the other holder terminal and the other terminal of said parallel branched tank circuit, direct current biasing circuits for said control grids, direct current charging circuits for said anodes and a source of modulating potentials coupled differentially between corresponding electrodes of said devices.

3. In a wave generating and wave length modulating system, a tank circuit having parallel branches, one of which branches comprises series capacitors and the other of which branches comprises an inductor, two electron discharge devices each having an anode, a control grid and a cathode, an alternating current coupling between the anode of one device and a point on said capacitive branch intermediate the series capacitors thereof, an alternating current coupling between the anode of the other device and a point on said inductor of said inductive branch of said circuit, an alternating current coupling between the cathodes of said devices and one terminal of the parallel branched tank circuit, a piezo-electric crystal in a holder having two terminals, an alternating current coupling between one terminal of the crystal holder and the control grids of said devices, an alternating current coupling between the other holder terminal and the other terminal of said parallel branched tank circuit, direct current biasing circuits for said control grids, direct current charging circuits for said anode and a source of modulating potentials differentially coupled to corresponding control electrodes of said devices.

4. In a wave generating and wave length modulating system, a tank circuit having parallel branches, one of which branches comprises series capacitors and the other of which branches comprises an inductor, two electron discharge devices each having an anode, a control grid and a cathode, an alternating current coupling between the anode of one device and a point on said capacitive branch intermediate the series capacitors thereof, an alternating current coupling between the anode of the other device and a point on said inductor of said inductive branch of said circuit, an alternating current coupling between the cathodes of said device and one terminal of the parallel branched tank circuit, a piezo-electric crystal in a holder having two terminals, a variable resistor connecting one terminal of said crystal holder to the other terminal of said branched circuit, an alternating current coupling between the other terminal of said holder and the control grids of said devices, direct current biasing circuits for said control grids, direct current charging circuits for said anodes and a source of modulating potentials differentially coupled to the control grids of said devices.

5. In a wave generating and wave length modulation system, a tank circuit including a capacitive branch and an inductive branch in parallel, a pair of discharge devices each having an anode, a control grid and a cathode, a piezo-electric crystal in a holder having two terminals, an alternating current circuit including said crystal tying the control grids of said devices together and coupling them to a point intermediate the terminals of one branch of said tank circuit, an alternating current coupling tying the cathodes of said devices together and coupling the same to points intermediate the terminals of both branches of said tank circuit, an alternating current coupling between the anode of one of said devices and a point intermediate the terminals of one branch of said tank circuit, an alternating current coupling between the anode of the other device and a point intermediate the terminals of the other branch of said tank circuit, the said couplings including said devices and crystal and tank circuit in a regenerative circuit for the production of oscillations, the arrangement being such that a portion of the capacitive branch is shunted by the impedance between the anode and cathode of one device and a portion of the inductive branch is shunted by the impedance between the anode and cathode of the other device, and a source of modulating potentials coupled differentially between corresponding electrodes of said devices.

GEORGE L. USSELMAN.

REFERENCES CITED

The following references are of record in the file of this patent:

UNITED STATES PATENTS

| Number | Name | Date |
| --- | --- | --- |
| 1,694,654 | Hammond, Jr. | Dec. 11, 1928 |
| 2,298,436 | Usselman | Oct. 13, 1942 |
| 2,309,083 | Usselman | Jan. 26, 1943 |
| 2,332,102 | Mason | Oct. 19, 1943 |
| 2,353,204 | Seeley | July 11, 1944 |